United States Patent Office 2,732,409
Patented Jan. 24, 1956

2,732,409

PARTIALLY DECHLORINATED HEXACHLOROCYCLOPENTADIENE

Elbert C. Ladd, Passaic, N. J., assignor to United States Rubber Company, New York, N. Y., a corporation of New Jersey No Drawing. Application October 30, 1952,
Serial No. 317,830

1 Claim. (Cl. 260—648)

This invention relates to improvements in the vulcanization of rubber.

More particularly, the invention relates to a novel vulcanizing agent for rubbery sulfur-vulcanizable conjugated diene hydrocarbon polymers and copolymers broadly, including natural Hevea rubber (a polyisoprene), polybutadiene, butadiene-styrene copolymers (GR–S), butadiene-p-methylstyrene copolymers, and other such hydrocarbon rubbers which are similarly vulcanizable with sulfur.

The rubbery synthetic copolymers are produced in known manner by the copolymerization of a butadiene with one or more copolymerizable mono-vinyl hydrocarbons.

Although certain halogen compounds have been proposed heretofore for use as vulcanizing agents, I have found that various polyhalogeno compounds including 1,1,2,3,4,4 - hexachloro - 1,3 - butadiene, 1,4 - dibromo-2 - butene, 1,2,2,3 - tethachlorobutane, and 1,3,3,4,5,6-hexachlorohexane either have weak curing action on rubber or have no curing action at all.

I have discovered that hexachlorocyclopentadiene can be partially dechlorinated to produce products having a less chlorine content than hexachlorocyclopentadiene, and which products can be used to vulcanize such rubbers as heretofore related.

The novel vulcanizing agents are referred to as partially dechlorinated hexachlorocyclopentadiene having between 60% and 75% chlorine content. The crude product is obtained as a dark brown tar, which is converted to a brown, friable solid by washing with acetone. The brown solid softens and darkens in the range of about 205° C. to 235° C. From the tarry material there can be isolated a very light-colored crystalline substance melting at 123–124° C.

To prepare such products, metallic copper is mixed with hexachlorocyclopentadiene and the mixture warmed, preferably in the presence of an inert diluent; chlorine is eliminated as copper chloride. The proportion of copper may range from one to two moles for each mole of hexachlorocyclopentadiene reacted upon.

The rate of the reaction may be varied and it is preferred to use a diluent having a boiling range in the neighborhood of 100° C. to 150° C. If a reflux technique is used, the mix is heated to reflux temperature, the heating source removed, and the reflux maintained by adding the copper powder at a suitable rate. A tar or friable solid results depending on the reaction conditions and the degree of purification. The product may be isolated by filtration of the mixture to remove copper chloride, and steam distilled to remove diluent and unreacted starting materials. Alternatively, the product may be precipitated after filtration by a non-solvent such as methanol.

I have further discovered that the said partially dechlorinated hexachlorocyclopentadiene products can be effectively used to vulcanize such rubbers, as heretofore related, to either the soft or the hard rubber state, in the absence of sulfur; nor is zinc oxide or any metal activator needed, although zinc oxide, magnesia, or litharge (0.5 to 20% on the rubber) accelerates the rate of reaction, and higher tensiles may be obtained in a shorter time with less vulcanizing agent when they are used. While the organic accelerators which are ordinarily used in curing rubber with sulfur, including the thiazyl sulfide accelerators, e. g., 2-mercaptobenzothiazole, may be used to advantage, they are not essential. For the attainment of high tensiles in the synthetic rubber compositions carbon black or other reinforcing filler should be incorporated.

The ethylenically unsaturated hydrocarbon rubbers, including natural rubber, are vulcanized according to my invention by mixing the rubber with the dechlorinated hexachlorocyclopentadiene and heating the mixture. The amount of the curing agent useful in giving soft vulcanizates ordinarily ranges from about 1% to about 5% of the weight of the rubber. Larger amounts of the curing agent, up to 100% or 200% of the weight of the rubber, can be used to produce increasingly harder and more rigid products.

The following examples illustrate the preparation of the vulcanizing agent, and its use in various rubber compositions.

EXAMPLE 1

A mixture of 272 grams of hexachlorocyclopentadiene and 300 grams of toluene are heated to reflux under a water cooled reflux condenser. The source of heat is removed and 63 grams of copper powder added at such a rate as to maintain reflux. After the addition is complete the mixture is heated at reflux for about one hour, cooled and filtered. The solid is washed with toluene and discarded. The combined filtrates are steam distilled until toluene and unreacted hexachlorocyclopentadiene are removed. The still residue is the desired product, and is obtained as a dark brown tar weighing 160 grams and analyzing 71.6% chlorine. The product in this form is suitable for use as a rubber vulcanizing agent. If desired, it may be further purified by dissolving it in a solvent and precipitating it by addition of a non-solvent; for example, a portion of the above tarry product is dissolved in dioxan and carefully precipitated by addition of methanol. The precipitate is filtered off, washed with methanol and air-dried to yield a readily friable, brown, odorless solid, analyzing about 68% chlorine.

Similar reactions have yielded friable, brown, odorless solids analyzing 64%–68% chlorine.

The following data in Table I, in which the parts are by weight, illustrate the use of the invention.

*Table I*

| | A | B | C | D | E | F |
|---|---|---|---|---|---|---|
| Composition: | | | | | | |
| Hevea Rubber | 100 | | | | | |
| Gr-S Rubber | | 100 | | 100 | | 100 |
| Rubbery Polybutadiene | | | | | 100 | |
| Rubbery alphamethyl-styrenebutadiene | | | 100 | | | |
| Carbon Black | | 50 | 50 | 50 | | |
| Zinc Oxide | 10 | 5 | 10 | 10 | | |
| Mercaptobenzothiazole | | | 1.5 | | | |
| Chemical of Example 1 | 5 | 2 | 3 | 1 | 200 | 200 |
| Cure: | | | | | | |
| Time of Cure (minutes) | 60 | 45 | 60 | 60 | 30 | 60 |
| Temperature of Cure (° F.) | 293 | 275 | 293 | 293 | 300 | 300 |
| Properties: | | | | | | |
| Tensile, lbs. per sq. inch | 2,200 | 2,350 | 2,710 | 2,090 | | |
| Elongation at break | 700 | 300 | 340 | 510 | | |
| Hardness (Shore D) | | | | | 85 | 65 |

If the combined filtrates referred to in Example 1 are cooled below room temperature a solid is precipitated which, after solution in and reprecipitation from acetone or methanol, is obtained as a pale yellow to nearly white crystalline solid which melts at 123–124° C.

*Analysis.*—Chlorine, 74.58, 74.85% (theoretical for $C_{10}Cl_{10}$, 74.72%); mol. wt. 437, 421. (Calculated for $C_{10}Cl_{10}$, 474.)

Another preparation of the same chemical was found to contain 74.2% of chlorine and to have a molecular weight of 465. From its molecular weight it is evidently a bis-cyclopentadiene derivative, the probable structure being

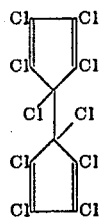

The vulcanized products are insoluble in benzene.

The vulcanizing agent of this invention may be used with any of the softeners, peptizing agents, fillers and other types of compounding ingredients commonly used with butadiene copolymer rubbers.

Having thus described my invention, what I claim and desire to protect by Letters Patent is:

The compound $C_{10}Cl_{10}$ melting at about 123–124° C., obtained by partial dechlorination of hexachlorocyclopentadiene.

References Cited in the file of this patent

UNITED STATES PATENTS

| | | |
|---|---|---|
| 2,478,036 | Baum | Aug. 2, 1949 |
| 2,504,295 | Beaver | Apr. 18, 1950 |
| 2,576,666 | Bluestone et al. | Nov. 27, 1951 |
| 2,598,561 | Kleiman | May 27, 1952 |
| 2,671,043 | Gilbert | Mar. 2, 1954 |

OTHER REFERENCES

Prins: "Rec. des. trav. Chim. des Pays-Bas," vol. 65, pages 455–67 (1946).